United States Patent
Kondo et al.

(10) Patent No.: US 11,742,153 B2
(45) Date of Patent: Aug. 29, 2023

(54) ELECTRODE-FORMING MATERIAL FOR ELECTROCHEMICAL CAPACITORS

(71) Applicants: DAICEL CORPORATION, Osaka (JP); TOKYO UNIVERSITY OF SCIENCE FOUNDATION, Tokyo (JP)

(72) Inventors: Takeshi Kondo, Tokyo (JP); Toshifumi Tojo, Tokyo (JP); Makoto Yuasa, Tokyo (JP); Kenjo Miyashita, Tokyo (JP); Atori Miki, Tokyo (JP); Masahiro Nishikawa, Tokyo (JP); Takahiro Tei, Tokyo (JP)

(73) Assignees: DAICEL CORPORATION, Osaka (JP); TOKYO UNIVERSITY OF SCIENCE FOUNDATION, Tokyo (JP)

( * ) Notice: Subject to any disclaimer, the term of this patent is extended or adjusted under 35 U.S.C. 154(b) by 180 days.

(21) Appl. No.: 17/435,990

(22) PCT Filed: Feb. 28, 2020

(86) PCT No.: PCT/JP2020/008237
§ 371 (c)(1),
(2) Date: Sep. 2, 2021

(87) PCT Pub. No.: WO2020/179653
PCT Pub. Date: Sep. 10, 2020

(65) Prior Publication Data
US 2022/0157536 A1    May 19, 2022

(30) Foreign Application Priority Data
Mar. 6, 2019 (JP) ................. 2019-040843

(51) Int. Cl.
*H01G 11/36* (2013.01)
*H01G 11/24* (2013.01)
*H01G 11/46* (2013.01)

(52) U.S. Cl.
CPC ............. *H01G 11/36* (2013.01); *H01G 11/24* (2013.01); *H01G 11/46* (2013.01)

(58) Field of Classification Search
CPC .......... H01G 11/24; H01G 11/36; H01G 11/46
See application file for complete search history.

(56) References Cited

U.S. PATENT DOCUMENTS

| 6,083,614 A | 7/2000 | Gordeev et al. |
| 8,043,533 B2 | 10/2011 | Tajima et al. |
| 2010/0320423 A1 | 12/2010 | Tajima et al. |
| 2020/0357578 A1* | 11/2020 | Kondo .................... C01B 32/26 |

FOREIGN PATENT DOCUMENTS

| JP | 11-511434 A | 10/1999 |
| JP | 2008-133173 A | 6/2008 |
| WO | WO 2013/146792 A1 | 10/2013 |

OTHER PUBLICATIONS

International Preliminary Report on Patentability and English translation of the Written Opinion of the International Searching Authority dated Aug. 25, 2021 for Application No. PCT/JP2020/008237.
International Search Report dated Apr. 21, 2020 for Application No. PCT/JP2020/008237 with an English translation.
Extended European Search Report for European Application No. 20766910.2, dated Nov. 29, 2022.

* cited by examiner

*Primary Examiner* — Eric W Thomas
(74) *Attorney, Agent, or Firm* — Birch, Stewart, Kolasch & Birch, LLP (57) ABSTRACT

Provided is an electrode-forming material for an electrochemical capacitor useful for forming an electrode of an electrochemical capacitor having a high storage capacity and a high energy density. The electrode-forming material for an electrochemical capacitor according to an embodiment of the present invention includes boron-doped nanodiamond (A) having a specific surface area of 110 m²/g or greater and an electrical conductivity at 20° C. of $5.0 \times 10^{-3}$ S/cm or greater; and a metal oxide (B), and the content of the (B) is from 20 to 95 mass % with respect to the total content of the (A) and (B).

17 Claims, 5 Drawing Sheets

ELECTRODE-FORMING MATERIAL FOR ELECTROCHEMICAL CAPACITORS

TECHNICAL FIELD

The present invention relates to an electrode-forming material for electrochemical capacitors. The present application claims priority to JP 2019-040843 filed in Japan on Mar. 6, 2019, the contents of which are incorporated herein.

BACKGROUND ART

It is known that when insulating diamond is doped with a high concentration of boron, holes are created (p-type semiconductors) and metallic conductivity is imparted. Boron-doped diamond (BDD), in which diamond is doped with a high concentration of boron, exhibits high physical and chemical stability resulting from the diamond and also exhibits excellent conductivity, and therefore, boron-doped diamond is known to be used as an electrode-forming material (for example, Patent Document 1).

In an electrochemical capacitor including an electrode containing boron-doped diamond particles, at an interface where the electrode and an electrolytic solution contact, positive and negative charges are oriented at a very short distance to form an electric double layer. The electrochemical capacitor is an power storage device that utilizes the positive and negative charges of the electric double layer to store charges, and has an electric double-layer capacitance due to a non-faradaic reaction process. As a result, high speed charging and discharging are possible with high current, and even if repeated charging and discharging is performed, the electrochemical capacitor is long lasting without degrading.

However, the electrochemical capacitor disadvantageously has a small storage capacity and a small energy density compared to secondary batteries.

On the other hand, in a pseudo double-layer capacitor using a metal oxide in an electrode, in addition to the electric double-layer capacitance generated due to the non-faradaic reaction process, charges can be stored due to a faradaic reaction process involving a redox reaction on the surface or in the vicinity of the surface of the metal oxide. As a result, it is possible to store a large amount of charges compared to a carbon-based electric double-layer capacitor. However, metal oxides have been problematic in that the applied cell voltage is low. In addition, as a metal oxide, for example, ruthenium oxide has also been problematic in that high cost is required because it is rare and expensive.

CITATION LIST

Patent Documents

Patent Document 1: JP 2008-133173 A

SUMMARY OF INVENTION

Technical Problem

It is therefore an object of the present invention to provide an electrode-forming material for an electrochemical capacitor useful for forming an electrode of an electrochemical capacitor having a high storage capacity and a high energy density.

Another object of the present invention is to provide an electrode-forming material for an electrochemical capacitor useful for forming an electrode of an electrochemical capacitor having a high storage capacity, a high energy density, and a high output density.

Yet another object of the present invention is to provide an electrode for an electrochemical capacitor including the electrode-forming material for an electrochemical capacitor.

Yet another object of the present invention is to provide an ink including the electrode-forming material for an electrochemical capacitor.

Yet another object of the present invention is to provide an electrochemical capacitor including the electrode.

Yet another object of the present invention is to provide an electronic device, an electric vehicle, or a power storage device including the electrode.

Solution to Problem

As a result of diligent research to solve the problems described above, the present inventors have found that boron-doped nanodiamond (hereinafter, may be referred to as "BDND") has excellent dispersibility and a large specific surface area, and in addition, a cell voltage of approximately 2 V can be applied thereto, and thus, in an electric double-layer capacitor using this in an electrode, an area of the electric double layer formed at an interface between the electrode and an electrolytic solution increases, and electric double-layer capacitance is increased due to a non-faradaic reaction process, as compared to a case of using boron-doped diamond particles having a large particle size.

Furthermore, they have discovered that when a mixture containing BDND and metal oxide at a specific proportion is used in the electrode, BDND suppresses aggregation of the metal oxide, thereby suppressing the amount of expensive metal oxide used, as compared to a case of using metal oxide alone, and an electrochemically effective area of the metal oxide can be increased, and the storage capacity per unit amount of the metal oxide can be increased to improve energy density. The present invention was completed based on these findings.

That is, the present invention provides an electrode-forming material for an electrochemical capacitor includes boron-doped nanodiamond (A) having a specific surface area of 110 $m^2/g$ or greater and an electrical conductivity at 20° C. of $5.0 \times 10^{-3}$ S/cm or greater; and a metal oxide (B), in which the content of the (B) is from 20 to 95 mass % with respect to the total content of the (A) and (B).

The present invention further provides the electrode-forming material for an electrochemical capacitor, in which the metal oxide (B) is ruthenium oxide.

The present invention further provides the electrode-forming material for an electrochemical capacitor, in which the boron-doped nanodiamond (A) has a median diameter of 200 nm or smaller.

The present invention further provides the electrode-forming material for an electrochemical capacitor, in which the metal oxide (B) has a median diameter of 1000 nm or smaller.

The present invention further provides an ink including the electrode-forming material for an electrochemical capacitor; and a binder.

The present invention further provides an electrode for an electrochemical capacitor, in which boron-doped nanodiamond (A) having a specific surface area of 110 $m^2/g$ or greater and an electrical conductivity at 20° C. of $5.0 \times 10^{-3}$ S/cm or greater, and a metal oxide (B) are carried on a base material, and the carrying amount of the (B) is from 20 to 95 mass % of the total carrying amount of the (A) and (B).

The present invention further provides an electrode for an electrochemical capacitor having a storage capacity of 10 F/g or greater.

The present invention further provides an electrochemical capacitor including the electrode.

The present invention further provides an electronic device including the electrochemical capacitor.

The present invention further provides an electric vehicle including the electrochemical capacitor.

The present invention further provides a power storage device including the electrochemical capacitor.

Advantageous Effects of Invention

Since the electrode-forming material for an electrochemical capacitor according to the present invention contains the BDND (A) and metal oxide (B) at a specific proportion, the (A) can suppress aggregation of the (B), and thus an electrochemically effective area of the (B) can be increased as compared to a case of using the (B) alone.

Therefore, the electrochemical capacitor including the electrode obtained using the electrode-forming material for an electrochemical capacitor according to the present invention can increase the storage capacity as compared to a case of including an electrode carrying the (A) alone. Furthermore, the electrochemical capacitor can have increased storage capacity per unit amount of the metal oxide as compared to a case of including an electrode carrying the (B) alone. As a result, an energy density can be increased and an output density can be increased.

An electronic device or an electric vehicle including the electrochemical capacitor (for example, including as a power supply or an auxiliary power supply) has large storage capacity, and is capable of rapid charging and discharging with high current. In other words, it has a high capacity and a high output. In addition, high charge/discharge efficiency (or small loss of charges associated with charging and discharging) and a long charge-discharge cycle life are exhibited.

Further, when the electrochemical capacitor having high capacity and high output, high charge/discharge efficiency, and long cycle life is used as a power storage device for renewable energy, the electrochemical capacitor can store a high capacity of electric power and can stably supply power over a long period of time by preventing power generation loss due to weather. Also, maintenance cost can be reduced.

DESCRIPTION OF EMBODIMENTS

[Electrode-Forming Material for Electrochemical Capacitor]

The electrode-forming material for an electrochemical capacitor according to an embodiment of the present invention (hereinafter, may be referred to as "electrode-forming material") includes BDND (A) and a metal oxide (B). The content of the (B) is from 20 to 95 mass % with respect to the total content of the (A) and (B).

The lower limit of the content of the (B) is preferably 25 mass %, more preferably 30 mass %, even more preferably 40 mass %, and particularly preferably 45 mass %, in that the storage capacity (preferably, the storage capacity per unit amount of the metal oxide (B), or the storage capacity per unit amount of the total content of the BDND (A) and the metal oxide (B)) can be increased and thus an electrode having a high energy density can be obtained. Furthermore, the upper limit of the content of the (B) is preferably 80 mass %, more preferably 70 mass %, particularly preferably 60 mass %, and most preferably 55 mass %, in that the storage capacity (preferably, the storage capacity per unit amount of the metal oxide (B), or the storage capacity per unit amount of the total content of the BDND (A) and the metal oxide (B)) can be obtained and thus an electrode having a high energy density can be obtained, and that the manufacturing cost of the electrode can be reduced.

Furthermore, the content of the (B) with respect to the total content of the (A) and (B) is preferably from 25 to 95 mass %, more preferably from 30 to 95 mass %, even more preferably from 40 to 90 mass %, and particularly preferably from 45 to 85 mass %, in that the energy density and the output density of the electrode can be improved.

The electrode-forming material according to an embodiment of the present invention may contain another carbon material in addition to BDND (A), but the proportion of the BDND (A) in all the carbon materials contained in the electrode-forming material is preferably, for example, 60 mass % or greater, in that the electrical conductivity is high, the specific surface area is large, and a high cell voltage (a cell voltage of, for example, 1.4 or greater, and preferably 1.5 or greater) can be applied, and is more preferably 70 mass % or greater, particularly preferably 80 mass % or greater, and most preferably 90 mass % or greater.

In addition to the (A) and the (B), the electrode-forming material according to an embodiment of the present invention can contain one or more types of other components. Examples of the other components include, for example, a dispersion medium. As the dispersion medium, an alcohol such as ethanol is preferable.

The electrode-forming material according to an embodiment of the present invention can be manufactured, for example, by dispersing the BDND (A) and the metal oxide (B) in a dispersion medium (for example, an alcohol such as ethanol or the like). The total content of the BDND (A) and the metal oxide (B) in the electrode-forming material is, for example, approximately from 1 to 20 mg, and preferably from 5 to 15 mg, per 1 mL of the dispersion medium.

When the BDND (A) and the metal oxide (B) are dispersed in the dispersion medium, for example, a high shearing mixer, a high shear mixer, a homomixer, a ball mill, a bead mill, a high pressure homogenizer, an ultrasonic homogenizer, or a colloid mill can be used.

(BDND (A))

The BDND (A) contains boron on the surface of nanodiamond particles (ND particles). The BDND preferably has a configuration in which a boron-containing diamond layer and/or carbon layer is deposited on the surface of the ND particles.

The BDND (A) has a boron content, for example, from 0.1 to 100 mg/g, preferably from 0.2 to 50 mg/g, particularly preferably from 0.3 to 10 mg/g, most preferably from 0.4 to 5 mg/g, and above all, most preferably from 0.5 to 2 mg/g. When the BDND (A) contains boron in the range described above, the BDND can exhibit excellent conductivity.

The specific surface area of the BDND (A) is 110 $m^2/g$ or greater, preferably 150 $m^2/g$ or greater, more preferably 200 $m^2/g$ or greater, even more preferably 300 $m^2/g$ or greater, even more preferably 400 $m^2/g$ or greater, particularly preferably 500 $m^2/g$ or greater, and most preferably 600 $m^2/g$ or greater. The upper limit of the specific surface area is, for example, 1500 $m^2/g$.

The particle size (D50, median diameter) of the BDND (A) is, for example, 200 nm or smaller, preferably 150 nm or smaller, and particularly preferably 120 nm or smaller. The lower limit of the particle size of the BDND is, for example, 1 nm. When the particle size exceeds the range above, the specific surface area is reduced, and the storage capacity of the electrode containing the BDND tends to be reduced. The particle size of the BDND can be measured using a dynamic light scattering method.

The electrical conductivity at 20° C. of the BDND (A) is $5.0 \times 10^{-3}$ S/cm or greater, preferably $10 \times 10^{-3}$ S/cm or greater, more preferably $15 \times 10^{-3}$ S/cm or greater, even more preferably $20 \times 10^{-3}$ S/cm or greater, particularly preferably $25 \times 10^{-3}$ S/cm or greater, and most preferably $30 \times 10^{-3}$ S/cm or greater. The upper limit of the electrical conductivity at 20° C. is, for example, approximately 1000 S/cm.

The BDND (A) has bands at from 1370 to 1420 $cm^{-1}$ and from 1580 to 1620 $cm^{-1}$ in a Raman spectrum with a light source wavelength of 325 nm.

The BDND (A) can be manufactured, for example, by a Chemical Vapor Deposition (CVD) method such as a thermal CVD method, a plasma CVD method, a light CVD method, and a laser CVD method. More specifically, in the presence of a carrier gas (for example, hydrogen gas or nitrogen gas) as necessary, film forming materials (a boron source and a carbon source) in a vaporized state are subjected to energy such as heat, plasma, ultraviolet light, or laser light to induce and promote a chemical reaction, and boron is deposited on the surface of ND particles as a base material (or the boron-containing diamond layer and/or carbon layer is deposited on the surface) to produce the BDND. In the present invention, of these CVD methods, a plasma CVD method (in particular, a microwave plasma CVD method) is preferred because high quality BDND can be obtained with little impurities.

Boron or boron compounds can be used as the boron source. Examples of the boron compounds include boron oxide, boron carbide, boron nitride, boric acid, diborane, triethylborane, trimethoxyborane, triethoxyborane, tripropoxyborane, and tri(1,1-dimethylethoxy)borane. One of these polyisocyanates can be used alone or two or more can be used in combination.

Examples of the carbon source include aliphatic hydrocarbons such as methane, ethane, propane, butane, pentane, hexane, heptane, and octane; alicyclic hydrocarbons such as cyclohexane; aromatic hydrocarbons such as benzene, toluene, xylene, and ethylbenzene; alcohols such as methanol, ethanol, isopropyl alcohol, and butanol; ketones such as acetone, methyl ethyl ketone, and methyl isobutyl ketone; ethers such as diethyl ether, dimethoxyethane, tetrahydrofuran, and dioxane; and esters such as methyl acetate, ethyl acetate, isopropyl acetate, and butyl acetate. One of these polyisocyanates can be used alone or two or more can be used in combination.

As the carbon source, use of a mixture of a ketone and an alcohol (for example, a mixed solution of acetone and methanol) is preferable from the perspective of ease of vaporization and excellent solubility of the boron source. The mixing ratio (v/v) of ketone and alcohol is, for example, from 95/5 to 60/40.

The concentration of the boron source included in the film forming material is, for example, from 10000 to 30000 ppm, and preferably from 15000 to 25000 ppm, relative to the carbon source. When the concentration of the boron source exceeds the above range, the crystallinity of the diamond layer and/or carbon layer tends to lower. On the other hand, when the concentration of the boron source falls below the range described above, conductivity is less likely to be obtained.

The pressure when carrying out the CVD method is, for example, from 30 to 80 Torr.

The CVD treatment time (or film forming time) is, for example, from 1 to 24 hours, and preferably from 5 to 12 hours.

After boron has been doped onto the surface of the ND particles by the CVD method (more specifically, after the boron-containing diamond layer and/or carbon layer has been grown on the surface of the ND particles), the produced BDND is subjected to a heating treatment and the structure of the diamond layer and/or carbon layer included in the BDND is optimized. This is preferable from the perspective that the specific surface area of the BDND can be dramatically increased, and the electrical double-layer capacitance of the electrode including the BDND can be increased.

The heating temperature in the heating treatment is, for example, from 400 to 600° C., and preferably from 400 to 500° C. The heating time is, for example, from 1 to 24 hours, and preferably from 5 to 12 hours.

The particle size (D50, median diameter) of the ND particles as a base material is, for example, 50 nm or smaller, preferably 30 nm or smaller, particularly preferably 20 nm or smaller, and most preferably 10 nm or smaller. The lower limit of the particle size of the ND particles as the base material is, for example, 1 nm.

As the ND particles used as base material, for example, detonation ND (i.e., ND generated by a detonation method) or high-temperature high-pressure ND (i.e., ND produced by a high-temperature high-pressure method) can be used. In an embodiment of the present invention, of the ND particles, detonation ND is preferable in that the specific surface area is greater.

(Metal oxide (B))

The metal oxide is a compound that has conductivity and can generate a pseudo-capacitance by a faradaic reaction (i.e., redox reaction). That is, a pseudo-capacitive substance. Examples of the metal oxide include molybdenum oxide, iridium oxide, tantalum oxide, manganese oxide, iron oxide, cobalt oxide, vanadium oxide, chromium oxide, tin oxide, niobium oxide, tantalum oxide, ruthenium oxide, indium oxide, titanium oxide, zirconium oxide, and nickel oxide. One of these polyisocyanates can be used alone or two or more can be used in combination.

In the present invention, of these, ruthenium oxide ($RuO_2$) is preferred from the perspective of having high electrical conductivity, and high physical and chemical stability.

The particle size (D50, median diameter) of the metal oxide (B) is preferably, for example, 1000 nm or smaller, more preferably 100 nm or smaller, and particularly preferably 50 nm or smaller in that the large specific surface area allows the progress of the redox reaction to promote, which allows the pseudo-capacitance to be increased. That is, the metal oxide (B) is preferably nanoparticles. The lower limit of the particle size is, for example, 1 nm. The particle size of the metal oxide (B) can be measured using a dynamic light scattering method.

For example, the ruthenium oxide nanoparticles can be produced by a sol-gel method. Ruthenium chloride, ruthenium alkoxide, or the like can be used as a raw material. When ruthenium chloride is used as the raw material, the reaction may become non-homogeneous due to dissociation of chlorine by hydrolysis, but in this case, the pH in the reaction system is maintained in a range from 6 to 8 using a hydrolysis inhibitor (e.g., sodium hydroxide, ammonium bicarbonate, etc.). As a result, homogeneous ruthenium oxide nanoparticles can be produced.

The ruthenium oxide nanoparticles obtained by the sol-gel method may be purified by, for example, washing with water or the like.

[Ink]

The ink according to an embodiment of the present invention includes the electrode-forming material described above; and a binder.

The binder is a compound capable of adhering and fixing the BDND (A) and the metal oxide (B) contained in the electrode-forming material on a base material without impairing the conductivity thereof. Examples of the binder include polymeric compounds having high proton conductivity (in particular, polymeric compounds having a sulfonate group). In the present invention, for example, commercially available products such as product of the trade name "Nafion" (available from SIGMA-ALDRICH) can be used.

The usage amount of the binder is, for example, approximately from 0.1 to 5 parts by mass, and preferably from 0.5 to 2 parts by mass, per 1 part by mass of the total of the BDND (A) and the metal oxide (B) contained in the electrode-forming material.

The ink according to an embodiment of the present invention may contain other components in addition to the electrode-forming material and the binder, but the proportion of the total content of the electrode-forming material (preferably, the BDND (A), the metal oxide (B), and the dispersion medium) and the binder in the total amount of the ink is, for example, 50 mass % or greater, preferably 70 mass % or greater, particularly preferably 80 mass % or greater, and most preferably 90 mass % or greater. Note that the upper limit is 100 mass %. That is, the ink according to an embodiment of the present invention may include only the electrode-forming material and the binder.

The ink according to an embodiment of the present invention can be manufactured, for example, by mixing the electrode-forming material (including the BDND (A), the metal oxide (B), and the dispersion medium) and the binder as described above. Note that in the present invention, an ink may be manufactured by mixing the electrode-forming material and the binder in advance, and a base material may be coated or impregnated with the ink, or a base material may be coated or impregnated with the electrode-forming material and the binder in a stepwise manner, and the electrode-forming material and the binder may be mixed on the base material to form an ink.

The ink according to an embodiment of the present invention has the configuration described above, and therefore can be suitably used in applications for forming an electrode for an electrochemical capacitor.

[Electrode for Electrochemical Capacitor]

In the electrode for the electrochemical capacitor according to an embodiment of the present invention, the BDND (A) and the metal oxide (B) are carried on a base material.

When a voltage is applied, the BDND (A) included in the electrode generates an electric double-layer capacitance due to a non-faradaic reaction process. Then, as described above, the BDND (A) has a large specific surface area, and therefore, the electric double layer has a large storage capacity.

Furthermore, the metal oxide (B) included in the electrode generates an electric double-layer capacitance due to the non-faradaic reaction process. At the same time, a pseudo-capacitance is generated due to a faradaic reaction process, that is, a redox reaction represented by Formula (1) below.

[Chem. 1]

$$Ru_2O_3 + H_2O \rightleftharpoons RuO_2 + 2e^- + 2H^+ \qquad (1)$$

The electron (e) is supplied from the BDND (A), and the proton ($H^+$) is supplied from an electrolyte aqueous solution.

Therefore, in the electrode for the electrochemical capacitor according to an embodiment of the present invention, by combining the following [1] to [3], progression of the redox reaction represented by Formula (1) above can be promoted, the pseudo-capacitance can be efficiently generated, and thus, the storage capacity can be increased.

[1] Increasing the carrying amount of the metal oxide (B)

[2] Increasing the contact area between the electrolytic solution supplying protons ($H^+$) and the metal oxide (B)

[3] Increasing the contact area between the BDND (A) supplying electrons and the metal oxide (B)

Furthermore, when the carrying amount (or the carrying proportion) of the (B) is below the range from 20 to 95 mass % with respect to the total content of the (A) and (B) (in other words, when the carrying amount of the (A) is excessive), the pseudo-capacitance is reduced, whereby it tends to be difficult to increase charge storage capacity.

On the other hand, even when the carrying amount (or the carrying proportion) of the (B) exceeds the range from 20 to 95 mass % with respect to the total content of the (A) and (B), the (B) has difficulty in effectively contacting the BDND (A) and the electrolytic solution, and therefore, the effect of further increasing the pseudo-capacitance is not achieved, which in turn tends to increase cost by excessive use of the expensive (B).

In addition, due to the increase in the carrying amount (or the carrying proportion) of the (B), the cell power (V) tends to decrease.

Therefore, the carrying amount of the (B) with respect to the total carrying amount of the (A) and (B) is preferably 30 mass % or greater, more preferably 40 mass % or greater, and particularly preferably 45 mass % or greater, in that the storage capacity (C) can be further increased to improve the energy density (E). The upper limit of the carrying amount of the (B) is, for example, preferably 80 mass %, more preferably 70 mass %, particularly preferably 60 mass %, and most preferably 55 mass %.

Note that the energy density (E) is an amount of energy stored in a unit mass, and is calculated by Equation (2) below.

$$E \text{ (Wh/Kg)} = CV^2/2 \qquad (2)$$

(where C represents a storage capacity and V represents a cell voltage)

The carrying amount of the (A) is, for example, approximately from 0.5 to 100 mg, preferably from 1 to 50 mg, particularly preferably from 2 to 10 mg, and most preferably from 2 to 5 mg, per 1 cm² of the electrode.

The carrying amount of the (B) is, for example, approximately from 0.5 to 100 mg, preferably from 1 to 50 g, particularly preferably from 2 to 10 mg, and most preferably from 2 to 5 mg, per 1 cm² of the electrode.

As described above, the electrode has a high electric double-layer capacitance and a high pseudo-capacitance, and thus has extremely excellent storage capacity. The storage capacity of the electrode is, for example, 10 F/g or greater, preferably 15 F/g or greater, particularly preferably 20 F/g or greater, and most preferably 25 F/g or greater. Note that the upper limit of the storage capacity is, for example, approximately 30 F/g.

In addition, in a typical electrode using activated carbon as the electrode-forming material, the storage capacity suddenly decreases rapidly as the scanning speed increases. However, according to the aforementioned electrode, the BDND (A) does not have a well-developed pore structure that is different from the activated carbon, and therefore, electrolyte ions are easily moved even during high-speed scanning, and the electric double layer can be quickly formed. As a result, even when the scanning speed increases, a reduction in the storage capacity can be suppressed, and the storage capacity can be maintained high even during high-speed scanning.

Furthermore, according to the aforementioned electrode, when the carrying amount of the (B) with respect to the total carrying amount of the (A) and (B) exceeds 20 mass % and is 95 mass % or smaller (more preferably from 30 to 95 mass %, particularly preferably from 40 to 90 mass %, and most preferably from 45 to 85 mass %), an output density (P) can be improved.

Note that the output density (P) is an amount of energy extracted for 1 second per unit mass, and is calculated by Equation (3) below.

$$P\ (W/Kg) = 3600 \times E/t \quad (3)$$

[where E represents an energy density (in Wh/kg) and t represents time (in seconds).]

The electrode can be manufactured, for example, by coating or impregnating the base material with the ink (including the electrode-forming material and the binder) described above.

Note that, as described above, the base material may be coated or impregnated with the electrode-forming material and the binder at a time using a mixture of all of these (=ink), but the base material may be coated or impregnated with the electrode-forming material and the binder in a stepwise manner. For example, the base material may be coated or impregnated with the electrode-forming material (including the (A), the (B), and the dispersion medium) described above, and then coated or impregnated with the binder.

After the base material is coated or impregnated with the (A), the (B), the dispersion medium, and the binder at a time or in a stepwise manner, a drying treatment is preferably performed to evaporate the dispersion medium.

An insulating base material or a conductive base material can be used as the base material. Examples of the insulating base material include silicon base materials, glass base materials, quartz base materials, ceramic base materials, and diamond base materials. Examples of the conductive base material include metal base materials such as titanium, molybdenum, niobium, aluminum, and stainless steel, and carbon base materials such as glassy carbon.

The electrode has a large storage capacity, and therefore can be suitably used, for example, in electrochemical capacitors used as power supplies or auxiliary power supplies, power storage devices, and the like of electronic devices, electric vehicles, and the like.

[Electrochemical Capacitor]

The electrochemical capacitor according to an embodiment of the present invention includes the electrode for the electrochemical capacitor described above. In addition, the electrochemical capacitor preferably includes an electrolytic solution and a separator, along with the electrode for the electrochemical capacitor described above.

An aqueous electrolytic solution and a non-aqueous electrolytic solution can be used as the electrolytic solution. Of these, an aqueous electrolytic solution is preferable from the perspective of excellent voltage resistance characteristics. Examples of the aqueous electrolytic solution include aqueous solutions of acids such as hydrochloric acid, sulfuric acid, acetic acid, and phosphoric acid; aqueous solutions of bases such as sodium hydroxide and ammonia; and aqueous solutions of salts such as lithium perchlorate, magnesium perchlorate, calcium perchlorate, barium perchlorate, aluminum perchlorate, sodium perchlorate, magnesium sulfate, potassium sulfate, and sodium sulfate.

Furthermore, the aqueous electrolytic solution may contain one or more types each of additives and water soluble organic solvents in a range that does not depart from the spirit of the present invention. Examples of the additives include salts such as tetraethylammonium perchlorate. Examples of the water soluble organic solvents include polyhydric alcohols such as ethylene glycol, propylene glycol, butanediol, glycerin, and poly $C_{2-4}$ alkylene glycols (e.g., diethylene glycol, triethylene glycol, tetraethylene glycol); and lactones.

Examples of the non-aqueous electrolytic solution include organic electrolytic solutions such as propylene carbonate, γ-butyrolactone, and acetonitrile, including quaternary ammonium salts such as tetraethylammonium tetrafluoroborate and triethylmethylammonium tetrafluoroborate.

Examples of the separator include polyolefin-based separators such as PP and PE; and porous separators such as nonwoven fabrics and glass fibers.

The electrochemical capacitor according to an embodiment of the present invention can be charged and discharged by connecting a power supply between two BDND electrodes immersed in an electrolytic solution and applying a voltage. During charging, electrolyte ions are adsorbed to the BDND electrode surface. During discharging, cations and anions adsorbed on the BDND electrode surface desorb and diffuse back into the electrolytic solution. Because charging and discharging does not involve chemical changes in the BDND electrode, the long life of the BDND electrode can be maintained without degradation due to charging and discharging.

The electrochemical capacitor according to an embodiment of the present invention has a large storage capacity. Furthermore, it can be charged and discharged at higher speed compared to typical secondary batteries. In other words, it has a high capacity and a high output. Moreover, it has an excellent charge-discharge cycle life. Therefore, for example, in electronic devices, electric vehicles, and the like, the electrochemical capacitor is useful as a power supply or an auxiliary power supply. It is also useful as a power storage device of electric power obtained by natural energy power generation such as solar power generation or wind power generation, a regenerative power storage system of an electric vehicle, or the like.

[Electronic Device, Electric Vehicle, and Power Storage Device]

The electronic device according to an embodiment of the present invention is provided with the electrochemical capacitor described above.

The electric vehicle according to an embodiment of the present invention is provided with the electrochemical capacitor described above.

The power storage device according to an embodiment of the present invention is provided with the electrochemical capacitor described above.

The electronic device includes, for example, a mobile device, an AV device, and the like.

The electric vehicle includes, for example, a hybrid car, an electric car, an electric train, a heavy construction vehicle, and the like.

Since the electronic device and the electric vehicle according to an embodiment of the present invention are provided with the electrochemical capacitor described above as a power supply or an auxiliary power supply, they need not to be charged frequently. In addition, the electronic device and the electric vehicle can be rapidly charged and discharged. Further, even when repeating charging and discharging, the electronic device and the electric vehicle are not be deteriorated, which contributes to a reduction in cost involved in maintenance. Furthermore, the electronic device and the electric vehicle according to an embodiment of the present invention can also be used as an emergency power supply.

Since the power storage device according to an embodiment of the present invention is provided with the electrochemical capacitor described above, it can stably store power for a long period of time and at a high capacity, and can be used in applications where power is stably supplied by preventing power generation loss due to weather. In addition, the power storage device can be rapidly charged and discharged, and has high charge/discharge efficiency. Further, the power storage device has a long charge-discharge cycle life. This contributes to a reduction in cost involved in maintenance. Therefore, according to the power storage device of an embodiment of the present invention, it is possible to store electric power generated by natural energy power generation such as solar power generation or wind power generation, to level the fluctuating generated power and transmit the leveled power, or to level an instantaneous large power of the load, and therefore, the natural energy power generation efficiency can be improved. In addition, the power storage device is useful in applications for regenerating and storing energy that has been lost as heat at the time of decelerating the electric vehicle in the related art.

EXAMPLES

Hereinafter, the present invention will be described more specifically with reference to examples, but the present invention is not limited by these examples.

Preparation Example 1 (Production of BDND)

(Formation)

First, a molded explosive attached with an electric detonator was placed inside a pressure-resistant vessel (iron vessel, volume: 15 m$^3$) for detonation, and the vessel was sealed. As the explosive, 0.50 kg of a mixture of TNT and RDX (TNT/RDX (mass ratio)=50/50) was used. Next, the electric detonator was triggered, and the explosive was detonated in the vessel. Subsequently, the vessel was left stand at the room temperature for 24 hours and thus lowering the temperature of the vessel and the contents. After this cooling, an ND crude product (including soot and aggregates of ND particles) was collected by scraping the ND crude product deposited on the inner wall of the vessel, with a spatula. The amount of the ND crude product collected was 0.025 kg.

(Oxidation Treatment)

Next, the ND crude product (3 g) produced in the formation process, concentrated sulfuric acid (80.6 g), and copper carbonate (catalyst amount) were loaded into a reactor, which was equipped with a condenser, while heating the reactor under 1 atm. In the condenser, a coolant at 50° C. was circulated, and an alkali trap connected to the condenser To this, fuming nitric acid (20.4 g, an amount at which the ratio of the concentrated sulfuric acid and nitric acid was 80/20 (former/latter; mass ratio)) was added dropwise. As the reaction proceeded, the evaporated nitric acid and the resulting $H_2O$ were condensed by the condenser and returned to inside the reactor. Meanwhile, NO, $NO_2$, CO, and $CO_2$ were collected in the alkali trap connected to the condenser. At this time, the reaction temperature was 150° C.

After 48 hours since the start of the reaction, heating of the reactor was stopped, and the inside of the reactor was cooled to room temperature. After cooling, the solid content (including ND aggregates) was washed with water by decantation. The initial supernatant liquid from the water washing was colored, and therefore washing of the solid content with water by decantation was repeated until the supernatant liquid became visually clear.

Disintegration

Next, 300 mL of a slurry produced in the previous process was subjected to crushing using a bead mill (trade name "Ultra Apex Mill UAM-015", available from Kotobuki Kogyou Co., Ltd.). In this process, zirconia beads (diameter: 0.03 mm) were used as the crushing media, the amount of beads filled in the mill container was set to 60% relative to the volume of the mill container, and the circumferential speed of a rotor pin rotating inside the mill container was set to 10 m/s. In addition, the crushing treatment was performed for 90 minutes at a flow rate of the slurry circulating through the apparatus set at 10 L/h.

Centrifugation

Next, a classification operation that utilizes the action of centrifugal force was performed to remove coarse particles (centrifugation treatment) from the solution containing the ND that had been subjected to the crushing process described above. The centrifugal force in this centrifugation treatment was set to 20000×g, and the duration of the centrifugation was set to 10 minutes. Through this centrifugation treatment, a black transparent ND aqueous dispersion (1) was obtained.

(Drying Step)

Next, an evaporator was used to evaporate off the liquid content from the ND aqueous dispersion (1) produced in the centrifugation treatment, after which the residual solid content was heated and dried at 120° C. using a drying oven.

As described above, a ND (1) (powder, median diameter (particle size D50) of 5 nm measured using a dynamic light scattering method) was produced.

Boron Doping

Using the obtained ND (1) as a base material, the base material was doped with boron by the MPCVD method under the following conditions. A raw material solution was prepared by adding trimethoxyborane to an acetone/methanol mixed solution (9:1, v/v) as a carbon source at a ratio that makes the concentration of boron atoms with respect to carbon atoms to be 20000 ppm. This raw material solution was used. Thus, BDND (1) was obtained.

<MPCVD Conditions>
Microwave power: 1300 W
Pressure: 50 Torr
Hydrogen gas flow rate: 400 sccm
Growth time: 8 h (Measurement of Particle Size, Specific Surface Area, and Electrical Conductivity)

The particle size (D50) of the produced BDND (1) was measured using a dynamic light scattering method. The result was 111 nm.

The BET specific surface area was measured by a nitrogen adsorption method. The result was 182.0 m$^2$/g.

Further, a glass capillary having an inner diameter of 1 mm was filled with the BDND (1) at 20° C., and the electrical conductivity was determined from the DC resistance at both ends. The result was 0.100 S/cm.

Figure 1:
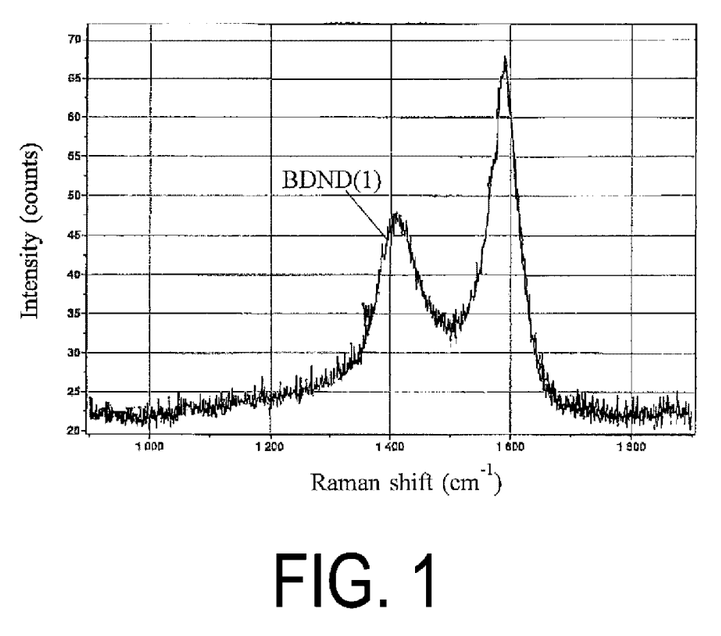
FIG. 1 shows UV Raman spectral data of BDND (1) obtained in Preparation Examples.

Additionally, from UV Raman spectrum (light source wavelength: 325 nm) measurement results for the BDND (1), a D-band and a G-band originating from sp$^2$ carbon were notably observed in the BDND (1) (FIG. 1).

Further, elemental analysis of BDND (1) was performed by an ICP-AES method, and as a result, it was found that the BDND (1) includes boron at an amount of 620 mg/kg.

The above results suggested that the BDND (1) is a composite having a structure in which an sp$^2$ carbon layer containing boron is deposited on the surface of the nanodiamond particles.

Preparation Example 2 (Production of Ruthenium Oxide Nanoparticles)

To 100 mL of 0.1 M RuCl$_3$ was added 30 mL of 1 M NaOH aqueous solution at a rate of 0.5 mL/min. The mixture was then stirred for 12 hours.

The reaction solution was then subjected to centrifugation treatment (7500 rpm×15 min) to remove the water, and the filtrate was further removed by suction filtration to obtain a filtered product.

The obtained filtered product was washed with water and subjected to vacuum drying (0.08 MPa, 120° C. for 12 hours or longer) to obtain ruthenium oxide nanoparticles (1). The particle size (D50) of the obtained ruthenium oxide nanoparticles (1) was measured using a dynamic light scattering method. The result was 50 nm.

Example 1 (Production of Electrode-Forming Material)

An electrode-forming material (1) (B/(A+B): 50%) was obtained by dispersing 5 mg of the produced BDND (1) and 5 mg of the ruthenium oxide nanoparticles (1) in 0.5 mL of 30 mass % ethanol.

An amount 20 μL of the obtained electrode-forming material (1) was cast onto a glassy carbon base material serving as a current collector and dried by heating at 60° C. Thereafter, 10 μL of 5 mass % Nafion (a perfluorocarbon having a configuration in which a perfluoro side chain with a sulfonate group is bonded to a hydrophobic Teflon (trade name) backbone) was cast onto the outermost surface thereof, and thereby an electrode (1) was obtained (BDND carrying amount per 1 cm$^2$ of electrode: 2.9 mg, ruthenium oxide nanoparticles 2.9 mg).

Example 2

An electrode-forming material (2) (B/(A+B): 20%) was obtained in the same manner as in Example 1 with the exception that 8 mg of BDND (1) and 2 mg of ruthenium oxide nanoparticles (1) were used, and an electrode (2) was obtained (BDND carrying amount per 1 cm$^2$ of electrode: 4.6 mg, ruthenium oxide nanoparticles 1.1 mg).

Example 3

An electrode-forming material (3) (B/(A+B): 80%) was obtained in the same manner as in Example 1 with the exception that 2 mg of BDND (1) and 8 mg of ruthenium oxide nanoparticles (1) were used, and an electrode (3) was obtained (BDND carrying amount per 1 cm$^2$ of electrode: 1.1 mg, ruthenium oxide nanoparticles 4.6 mg).

Comparative Example 1

An electrode-forming material (4) (B/(A+B): 0%) was obtained in the same manner as in Example 1 with the exception that 10 mg of BDND (1) was used and ruthenium oxide nanoparticles (1) were not used, and an electrode (4) was obtained (BDND carrying amount per 1 cm$^2$ of electrode: 5.7 mg, ruthenium oxide nanoparticles 0 mg).

Comparative Example 2

An electrode-forming material (5) (B/(A+B): 100%) was obtained in the same manner as in Example 1 with the exception that 10 mg of ruthenium oxide nanoparticles (1) were used and BDND (1) was not used, and an electrode (5) was obtained (BDND carrying amount per 1 cm$^2$ of electrode: 0 mg, ruthenium oxide nanoparticles 5.7 mg).

[Evaluation 1]

Figure 2:
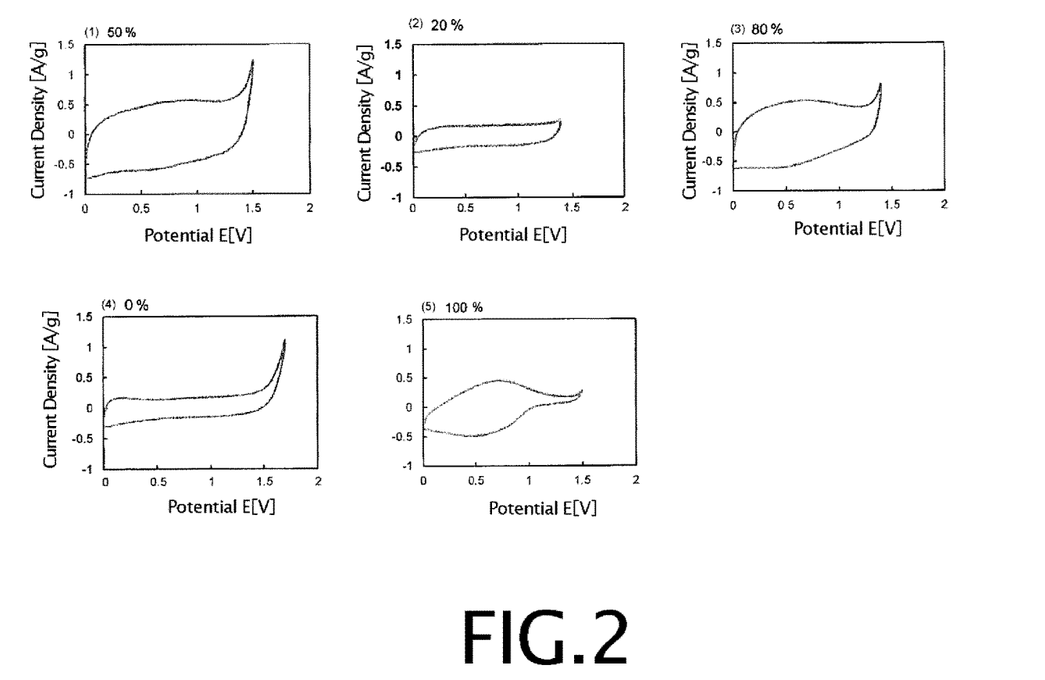
FIG. 2 shows the results of CV measurements (scan speed: 10 mV/s) of a symmetric two-electrode cell that uses electrodes obtained in Examples and Comparative Examples, the measurements being performed in 1M $H_2SO_4$.

CV measurements (cyclic voltammetry, scan speed: 10 mV/s) of a symmetric two-electrode cell that uses electrodes obtained in the Examples and Comparative Examples were performed in 1M H$_2$SO$_4$. The electrode potential was linearly swept from 0 V, and a range where oxygen and hydrogen were not generated was determined as a cell voltage. The results are illustrated in FIG. 2.

The cell voltages are summarized and shown in the table below.

TABLE 1

|  | B/(A + B): % | Cell potential (V) |
| --- | --- | --- |
| Example 1 | 50 | 1.5 |
| Example 2 | 20 | 1.4 |
| Example 3 | 80 | 1.4 |
| Comparative Example 1 | 0 | 1.7 |
| Comparative Example 2 | 100 | 1.5 |

From FIG. 2, when the RuO$_2$ nanoparticles were carried on the electrode, peaks were seen in the vicinity of 0.7 V. As a result of this, it was found that a redox reaction of the RuO$_2$ nanoparticles occurred to generate a pseudo-capacitance. Therefore, it was found that when the RuO$_2$ nanoparticles were carried on the electrode, the cell voltage decreased, but the current density increased.

[Evaluation 2]

The change in storage capacity was measured when the scanning speed was changed in a range from 10 mV/s to 10000 mV/s using a symmetric two-electrode cell (1 M $H_2SO_4$) using the electrodes obtained in the Examples and Comparative Examples. The results are illustrated in FIG. 3.

Figure 3:
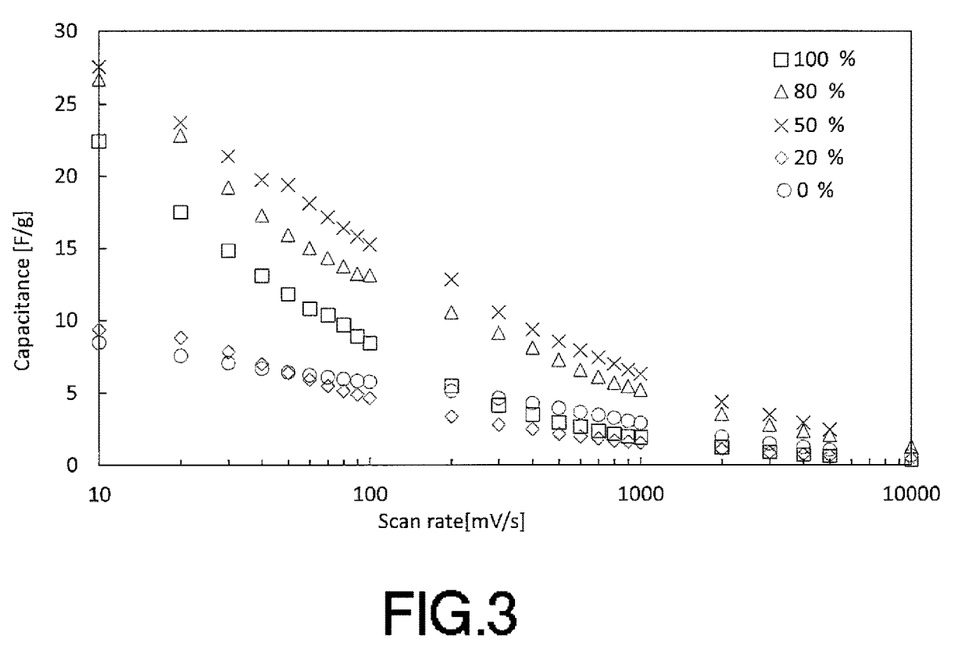
FIG. 3 shows plots of the storage capacity versus the scan speed in 1M $H_2SO_4$ for the symmetric two-electrode cell that uses the electrodes obtained in the Examples and Comparative Examples.

From FIG. 3, in the electrodes obtained in the Examples, when the carrying proportion of the $RuO_2$ nanoparticles was increased from 20 mass %, it was confirmed that the storage capacity was increased in association with such increase of the carrying proportion of the $RuO_2$ nanoparticles; in the case where the carrying proportion of the $RuO_2$ nanoparticles was approximately from 50 to 80 mass % at a peak, the storage capacity was increased more than in the case where the carrying proportion of the $RuO_2$ nanoparticles was 100 mass %; and the storage capacity was less likely to be reduced even during high-speed scanning.

[Evaluation 3]

Figure 4:
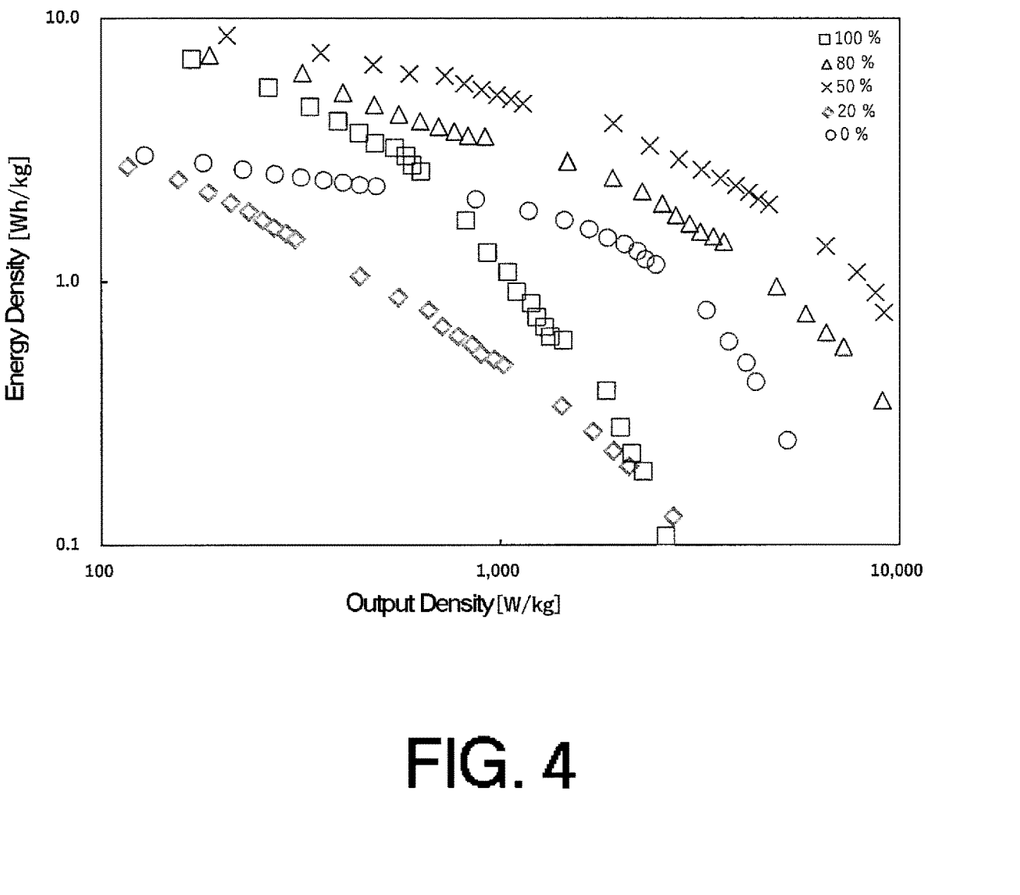
FIG. 4 is Ragone plots for the symmetric two-electrode cell that uses the electrodes obtained in the Examples and Comparative Examples.

Ragone plots (change in energy density Wh/Kg when the output density was changed in a range from 100 W/Kg to 10000 W/Kg) for the symmetric two-electrode cell (1 M $H_2SO_4$) using the electrodes obtained in the Examples and Comparative Examples are shown in FIG. 4.

From FIG. 4, in the electrodes obtained in the Examples, when the carrying proportion of the $RuO_2$ nanoparticles was increased from 20 mass %, it was confirmed that the energy density and the output density were improved in association with such increase of the carrying proportion of the $RuO_2$ nanoparticles; and in the case where the carrying proportion of the $RuO_2$ nanoparticles was approximately from 50 to 80 mass % at a peak, the electrode had higher energy density and higher output density than that in the case where the carrying proportion of the $RuO_2$ nanoparticles was 100 mass %.

[Evaluation 4]

Figure 5:
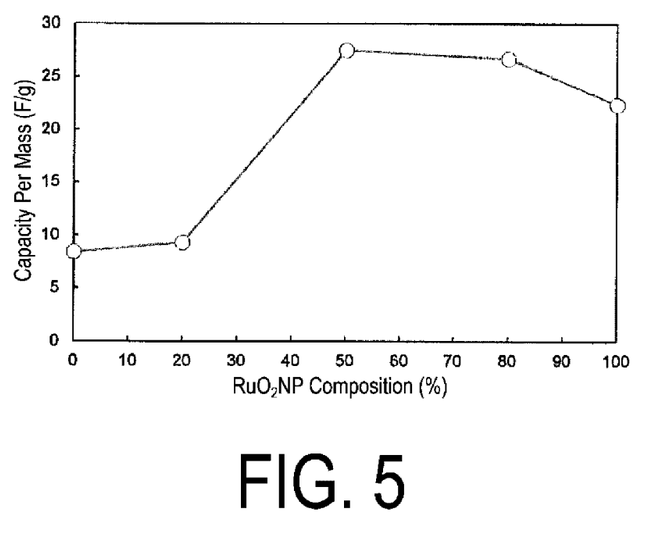
FIG. 5 is a graph showing the relationship between the proportion of the carrying amount of $RuO_2$ nanoparticles with respect to the total carrying amount of BDND and $RuO_2$ nanoparticles (=$RuO_2NP$) in the electrode and the storage capacity per mass.

Regarding the symmetric two-electrode cell using the electrodes obtained in the Examples and Comparative Examples, the relationship between the carrying proportion of the $RuO_2$ nanoparticles and the storage capacity (F/g) per mass in 1 M $H_2SO_4$ at a scan speed of 10 mV/s is shown in FIG. 5.

From FIG. 5, in the electrodes obtained in the Examples, when the carrying proportion of the $RuO_2$ nanoparticles was increased from 20 mass %, it was confirmed that the storage capacity per mass was increased associated with such increase of the carrying proportion of the $RuO_2$ nanoparticles; and in the case where the carrying proportion of the $RuO_2$ nanoparticles was approximately from 50 to 80 mass % at a peak, the storage capacity per mass was increased more than in the case where the carrying proportion of the $RuO_2$ nanoparticles was 100 mass %.

According to the above, when the electrode according to an embodiment of the present invention is used, a compact device having a high output can be produced inexpensively.

To summarize the above, configurations and variations of the present invention are described below.

[1] A composition including boron-doped nanodiamond (A) having a specific surface area of 110 $m^2/g$ or greater and an electrical conductivity at 20° C. of $5.0 \times 10^{-3}$ S/cm or greater; and a metal oxide (B), in which the content of the (B) is from 20 to 95 mass % with respect to the total content of the (A) and (B).

[2] The composition according to [1], in which the metal oxide (B) is ruthenium oxide.

[3] The composition according to [1] or [2], in which the boron-doped nanodiamond (A) has a median diameter of 200 nm or smaller.

[4] The composition according to any one of [1] to [3], in which the metal oxide (B) has a median diameter of 1000 nm or smaller.

[5] The composition according to any one of [1] to [4], in which the proportion of the boron-doped nanodiamond (A) in the total carbon material contained in the composition is 60 mass % or greater.

[6] The composition according to any one of [1] to [5], in which the boron-doped nanodiamond (A) has a boron content from 0.1 to 100 mg/g.

[7] The composition according to any one of [1] to [6], in which the boron-doped nanodiamond (A) has a median diameter of 200 nm or smaller.

[8] The composition according to any one of [1] to [7], in which the boron-doped nanodiamond (A) has bands at from 1370 to 1420 $cm^{-1}$ and from 1580 to 1620 $cm^{-1}$ in a Raman spectrum with a light source wavelength of 325 nm.

[9] The composition according to any one of [1] to [8], which is an electrode-forming material for an electrochemical capacitor.

[10] Use of the composition described in any one of [1] to [8] as the electrode-forming material for an electrochemical capacitor.

[11] A method for manufacturing an electrode-forming material for an electrochemical capacitor, the method including manufacturing the electrode-forming material for an electrochemical capacitor using the composition described in any one of [1] to [8].

[12] An ink including the composition described in any one of [1] to [8]; and a binder.

[13] Use of the ink including the composition described in any one of [1] to [8]; and the binder, as an ink for an electrochemical capacitor.

[14] A method for manufacturing an ink for an electrochemical capacitor, the method including manufacturing the ink for the electrochemical capacitor using the composition described in any one of [1] to [8] and the binder.

[15] An electrode for an electrochemical capacitor, in which boron-doped nanodiamond (A) having a specific surface area of 110 $m^2/g$ or greater and an electrical conductivity at 20° C. of $5.0 \times 10^{-3}$ S/cm or greater, and a metal oxide (B) are carried on a base material, and the carrying amount of the (B) is from 20 to 95 mass % of the total carrying amount of the (A) and (B).

[16] The electrode for the electrochemical capacitor according to [15], having a storage capacity of 10 F/g or greater.

[17] An electrochemical capacitor including the electrode described in [15] or [16].

[18] An electronic device including the electrochemical capacitor described in [17].

[19] An electric vehicle including the electrochemical capacitor described in [17].

[20] A power storage device including the electrochemical capacitor described in [17].

[21] A method for manufacturing an electronic device, the method including manufacturing the electronic device using the electrochemical capacitor described in [17].

[22] A method for manufacturing an electric vehicle, the method including manufacturing the electric vehicle using the electrochemical capacitor described in [17].

[23] A method for manufacturing a power storage device, the method including manufacturing the power storage device using the electrochemical capacitor described in [17].

The invention claimed is:

1. An electrode-forming material for an electrochemical capacitor comprising boron-doped nanodiamond (A) having a specific surface area of 110 $m^2/g$ or greater and an electrical conductivity at 20° C. of $5.0 \times 10^{-3}$ S/cm or greater;

and a metal oxide (B), wherein a content of the (B) is from 20 to 95 mass % with respect to a total content of the (A) and (B).

2. The electrode-forming material for an electrochemical capacitor according to claim 1, wherein the metal oxide (B) is ruthenium oxide.

3. The electrode-forming material for an electrochemical capacitor according to claim 1, wherein the boron-doped nanodiamond (A) has a median diameter of 200 nm or smaller.

4. The electrode-forming material for an electrochemical capacitor according to claim 1, wherein the metal oxide (B) has a median diameter of 1000 nm or smaller.

5. An ink comprising the electrode-forming material for an electrochemical capacitor described in claim 1; and a binder.

6. The electrode-forming material for an electrochemical capacitor according to claim 1, wherein the content of the (B) is from 45 to 95 mass %.

7. The electrode-forming material for an electrochemical capacitor according to claim 1, wherein the proportion of the boron-doped nanodiamond (A) in the total carbon material contained in the composition is 60 mass % or greater.

8. The electrode-forming material for an electrochemical capacitor according to claim 1, wherein the boron-doped nanodiamond (A) has a boron content from 0.1 to 100 mg/g.

9. The electrode-forming material for an electrochemical capacitor according to claim 1, wherein the boron-doped nanodiamond (A) has bands at from 1370 to 1420 $cm^{-1}$ and from 1580 to 1620 $cm^{-1}$ in a Raman spectrum with a light source wavelength of 325 nm.

10. An electrode for an electrochemical capacitor, wherein boron-doped nanodiamond (A) having a specific surface area of 110 $m^2/g$ or greater and an electrical conductivity at 20° C. of $5.0 \times 10^{-3}$ S/cm or greater, and a metal oxide (B) are carried on a base material, and a carrying amount of the (B) is from 20 to 95 mass % of a total carrying amount of the (A) and (B).

11. The electrode for an electrochemical capacitor according to claim 10, having a storage capacity of 10 F/g or greater.

12. An electrochemical capacitor comprising the electrode described in claim 10.

13. An electronic device comprising the electrochemical capacitor described in claim 12.

14. An electric vehicle comprising the electrochemical capacitor described in claim 12.

15. A power storage device comprising the electrochemical capacitor described in claim 12.

16. A method for manufacturing an electrode for an electrochemical capacitor, comprising the step of coating a base material with a composition,
wherein the composition comprising boron-doped nanodiamond (A) having a specific surface area of 110 $m^2/g$ or greater and an electrical conductivity at 20° C. of $5.0 \times 10^{-3}$ S/cm or greater; and a metal oxide (B), wherein a content of the (B) is from 20 to 95 mass % with respect to a total content of the (A) and (B).

17. A method for manufacturing an electrochemical capacitor, comprising the step of coating a base material with a composition,
wherein the composition comprising boron-doped nanodiamond (A) having a specific surface area of 110 $m^2/g$ or greater and an electrical conductivity at 20° C. of $5.0 \times 10^{-3}$ S/cm or greater; and a metal oxide (B), wherein a content of the (B) is from 20 to 95 mass % with respect to a total content of the (A) and (B).

\* \* \* \* \*